(12) United States Patent
Murakami (10) Patent No.: US 7,418,114 B2
(45) Date of Patent: Aug. 26, 2008

(54) PRINT TONE MEASURING METHOD

(75) Inventor: Shigeo Murakami, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 764 days.

(21) Appl. No.: 10/860,155

(22) Filed: Jun. 4, 2004

(65) Prior Publication Data
US 2004/0252317 A1 Dec. 16, 2004

(30) Foreign Application Priority Data

Jun. 11, 2003 (JP) .............................. 2003-166335
Jun. 11, 2003 (JP) .............................. 2003-166336

(51) Int. Cl.
*G06K 9/00* (2006.01)
(52) U.S. Cl. .................................... 382/112
(58) Field of Classification Search .................. 382/112
See application file for complete search history.

(56) References Cited

U.S. PATENT DOCUMENTS

| | | | | |
|---|---|---|---|---|
| 4,680,805 A | * | 7/1987 | Scott | 382/197 |
| 4,752,822 A | * | 6/1988 | Kawamura | 358/523 |
| 4,827,526 A | * | 5/1989 | Matsumoto | 382/112 |
| 5,128,711 A | * | 7/1992 | Terashita et al. | 355/41 |
| 5,138,667 A | * | 8/1992 | Roch et al. | 382/112 |
| 5,434,956 A | * | 7/1995 | Son et al. | 358/1.5 |
| 5,444,468 A | * | 8/1995 | Fukushima et al. | 347/14 |
| 5,459,589 A | * | 10/1995 | Ohnishi et al. | 358/518 |
| 5,548,691 A | * | 8/1996 | Sato et al. | 358/1.14 |
| 5,708,514 A | * | 1/1998 | Higuchi et al. | 358/3.03 |

(Continued)

FOREIGN PATENT DOCUMENTS

DE 19940879 3/2001

(Continued)

OTHER PUBLICATIONS

Japanese Office Action issued in Japanese Patent Application No. JP 2003-166335, dated Dec. 25, 2007.

(Continued)

*Primary Examiner*—Vikkram Bali
*Assistant Examiner*—David P Rashid
(74) *Attorney, Agent, or Firm*—McDermott Will & Emery LLP (57) ABSTRACT

A print tone measuring method includes a reference paper image pickup step for reading an image of reference paper to obtain first image data, a designated control point setting step for setting designated control points, a first reference point setting step for setting a pair of first reference points for specifying image positions, a print reading step for reading an image of an actual print to obtain second image data, a second reference point setting step for setting a pair of second reference points corresponding to the first reference points, a calculating step for calculating positions of corresponding control points corresponding to the designated control points from the first reference points and the second reference points, an extracting step for extracting image data adjacent each of the designated control points and image data adjacent each of the corresponding control points, and a correcting step for correcting the position of each corresponding control point in the second image data by comparing the image data adjacent each designated control point and the image data adjacent each corresponding control point.

6 Claims, 7 Drawing Sheets

U.S. PATENT DOCUMENTS

| | | | |
|---|---|---|---|
| 5,712,921 A * | 1/1998 | Zabele | 382/112 |
| 5,841,451 A * | 11/1998 | Hirabayashi et al. | 347/41 |
| 5,903,712 A * | 5/1999 | Wang et al. | 358/1.9 |
| 5,999,636 A * | 12/1999 | Juang | 382/112 |
| 6,024,018 A | 2/2000 | Darel et al. | |
| 6,081,608 A * | 6/2000 | Fujii et al. | 382/112 |
| 6,108,105 A * | 8/2000 | Takeuchi et al. | 358/1.2 |
| 6,243,501 B1 * | 6/2001 | Jamali | 382/305 |
| 6,275,600 B1 * | 8/2001 | Banker et al. | 382/112 |
| 6,333,997 B1 * | 12/2001 | Hashiya et al. | 382/201 |
| 6,351,556 B1 * | 2/2002 | Loui et al. | 382/164 |
| 6,382,101 B1 | 5/2002 | Richards | |
| 2001/0020427 A1 * | 9/2001 | Shiraishi | 101/365 |
| 2002/0080407 A1 * | 6/2002 | Hatayama et al. | 358/3.06 |
| 2003/0011798 A1 | 1/2003 | Yamamoto et al. | |
| 2003/0113000 A1 * | 6/2003 | Hyoki et al. | 382/112 |

FOREIGN PATENT DOCUMENTS

| | | |
|---|---|---|
| EP | 0 798 117 A2 | 10/1997 |
| JP | 4-303660 | 10/1992 |
| JP | 8-261829 | 10/1996 |
| JP | 10-67099 | 3/1998 |
| JP | 10-305562 | 11/1998 |
| JP | 11-227167 | 8/1999 |
| JP | 2000-330424 | 11/2000 |
| JP | 2001-293847 | 10/2001 |
| JP | 2001-353852 | 12/2001 |
| JP | 2000-10090 | 1/2002 |

OTHER PUBLICATIONS

Japanese Office Action issued in Japanese Patent Application No. JP 2003-166336, dated Dec. 11, 2007.

* cited by examiner

PRINT TONE MEASURING METHOD

BACKGROUND OF THE INVENTION

1. Field of the Invention

This invention relates to a print tone measuring method.

2. Description of the Related Art

In order to perform proper printing with a printing machine, it is necessary to control ink feeding rates properly. For controlling the ink feeding rates, it has been conventional practice to measure densities of control strips with a densitometer and determine from density data whether the ink feeding rates are proper or not. However, the density data from the control strips alone is not necessarily sufficient for attaining a proper color tone and the like for a picture area.

For this reason, a print tone measuring apparatus is used which provides control data for controlling the ink feeding rates of a printing machine. The control data is produced by comparing an image on reference paper and an image on an actual print.

The reference paper is also called proof paper, and serves as a reference indicating a color tone of finished prints to obtain proper prints. Printing paper actually printed is also called sampling paper which is extracted by the operator from a discharge station of a printing machine at certain intervals during a printing operation. The printing is considered proper when the color tone of the sampling paper substantially coincides with the color tone of the reference paper.

Where such a print tone measuring apparatus is used, it is difficult to attain an agreement in color tone and the like in all areas between the image on the reference paper and the image on the actual print. For this reason, use is made of control points such as representative points having colors that characterize a picture pattern on the print. These control points are key points used in order to control the ink feeding rates, and are set to the image by the operator.

The control points must be set to accurately corresponding positions on the image of the reference paper and the image of the actual print. Japanese Unexamined Patent Publication No. 10-305562 (1998) discloses a print evaluating apparatus, in which a pair of reference points are specified on each of an image of reference paper and an image of an actual print for indicating image positions, and positions of control points on the image of the actual print are calculated from these reference points and the control points on the image of the reference paper.

With the above method, however, a partial distortion of the image of the print makes it impossible to attain an accurate corresponding relationship between the control points on the image of the reference paper and those on the image of the print. That is, a curvature aberration of an image pickup optical system for reading images from the reference paper and print, or an error due to a distortion of printing paper, results in a displacement between the control points on the image of the reference paper and those on the image of the print. Such a displacement hampers an accurate measurement of the print tone.

An image area usually is formed of halftone dots. Particularly where large halftone dots are used, a disagreement may occur between color information on a single pixel and color information on an image formed of a plurality of halftone dots. Noise of a CCD camera acting as an image pickup device, or dust or scratches on the print, may also hamper an accurate measurement based on color information on a single pixel.

SUMMARY OF THE INVENTION

The object of this invention, therefore, is to provide a print tone measuring method capable of attaining an accurate corresponding relationship between control points on an image of reference paper and those on an image of an actual print, thereby enabling an accurate measurement of the print.

The above object is fulfilled, according to this invention, by a print tone measuring method for obtaining data for controlling ink feeding rates of a printing machine by comparing data of control points in image data obtained by reading an image of reference paper and data of control points in image data obtained by reading an image of an actual print, the method comprising:

a reference paper reading step for reading the image of the reference paper to obtain first image data;

a designated control point setting step for setting designated control points to the first image data for use in measuring the print, the designated control points being set to respective regions on the reference paper corresponding to ink keys of the printing machine;

a first reference point setting step for setting a pair of first reference points to the first image data for specifying image positions;

a print reading step for reading the image of the actual print to obtain second image data;

a second reference point setting step for setting a pair of second reference points to the second image data to correspond to the first reference points;

a first calculating step for calculating, from the first reference points and the second reference points, positions of corresponding control points in the second image data corresponding to the designated control points in the first image data, for the respective regions corresponding to the ink keys of the printing machine;

an extracting step for extracting image data adjacent each of the designated control points and image data adjacent each of the corresponding control points;

a correcting step for correcting the position of each of the corresponding control points in the second image data by comparing the image data adjacent each of the designated control points and the image data adjacent each of the corresponding control points;

a first selecting step for comparing image data including each of the designated control points, of each of the regions corresponding to the ink keys of the printing machine, among the image data adjacent the designated control points in the first image data, with a plurality of templates having different pixel arrangements, selecting a template closest to the image of the region including each of the designated control points, and selecting pixels corresponding in position to pixels arranged in the selected template, as relevant pixels in the first image data;

a second selecting step for selecting, from the corresponding control points corrected, positions of relevant pixels in the second image data corresponding to the relevant points in the first image data, for the respective regions corresponding to the ink keys of the printing machine; and a second calculating step for calculating data for controlling the ink feeding rates of the printing machine by comparing color values of the relevant pixels in the first image data and color values of the relevant pixels in the second image data for the respective regions corresponding to the ink keys of the printing machine.

This print tone measuring method corrects the positions of the corresponding control points by comparing the image data adjacent the designated control points and the image data adjacent the corresponding control points. Thus, an accurate agreement is achieved between the control points in the image of the reference paper and those in the image of the actual print, thereby enabling an accurate measurement of the print tone.

In another aspect of the invention, a print tone measuring method is provided for measuring tones of an actual print by comparing data of control points in reference image data and data of control points in image data obtained by reading an image of the actual print, the method comprising:

a first storing step for storing the reference image data as first image data;

a second storing step for storing the image data obtained by reading the image of the actual print as second image data;

a reference point setting step for setting first reference points to the first image data, and second reference points to the second image data to correspond to the first reference points;

a designated control point setting step for setting designated control points to one of the first image data and the second image data for use in measuring the print;

a calculating step for calculating, from the first reference points and the second reference points, positions of corresponding control points in the other of the first image data and the second image data corresponding to the designated control points in the one of the first image data and the second image data;

an extracting step for extracting image data adjacent the designated control points and image data adjacent the corresponding control points; and a correcting step for correcting the positions of the corresponding control points by comparing the image data adjacent the designated control points and the image data adjacent the corresponding control points.

In a further aspect of the invention, a print tone measuring method is provided for obtaining data for controlling ink feeding rates of a printing machine by comparing first image data serving as a reference and second image data obtained by reading an image of a print actually made by the printing machine, the method comprising:

a control point setting step for setting positions of control points to the first image data;

an extracting step for extracting image data adjacent the control points from the first image data;

a selecting step for comparing image data including the control points among the image data adjacent the control points in the first image data, with a plurality of templates having different pixel arrangements, selecting a template closest to the image of the region including the control points, and selecting pixels corresponding in position to pixels arranged in the selected template, as relevant pixels in the first image data;

a print reading step for reading the image of the actual print to obtain second image data; and a calculating step for calculating data for controlling the ink feeding rates of the printing machine by comparing color values of the relevant pixels in the first image data and color values of relevant pixels in the second image data corresponding to the relevant pixels in the first image data.

With this print tone measuring method, color may be measured accurately even where large halftone dots are used, noise occurs with a CCD camera, or dust or scratches is/are present on the print.

Other features and advantages of the invention will be apparent from the following detailed description of the embodiments of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Figure 1:
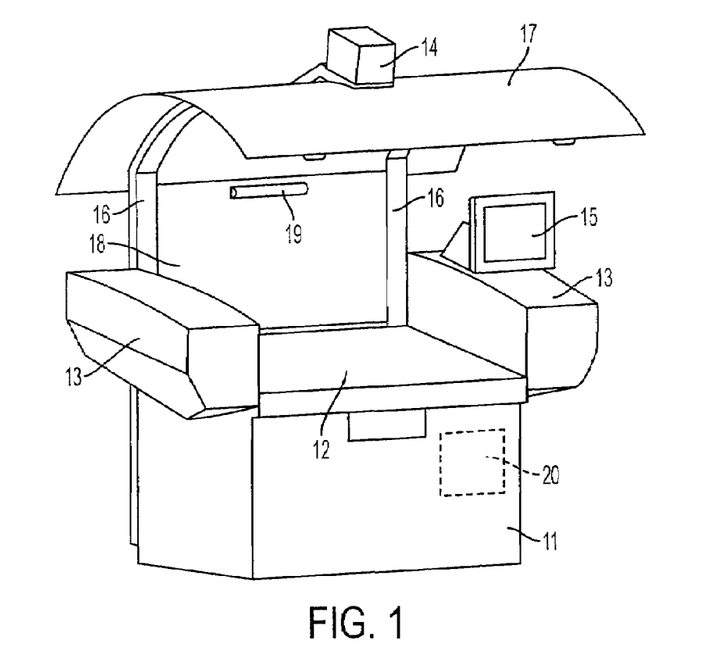
FIG. 1 is a perspective view of a print tone measuring apparatus according to this invention.
Figure 2:
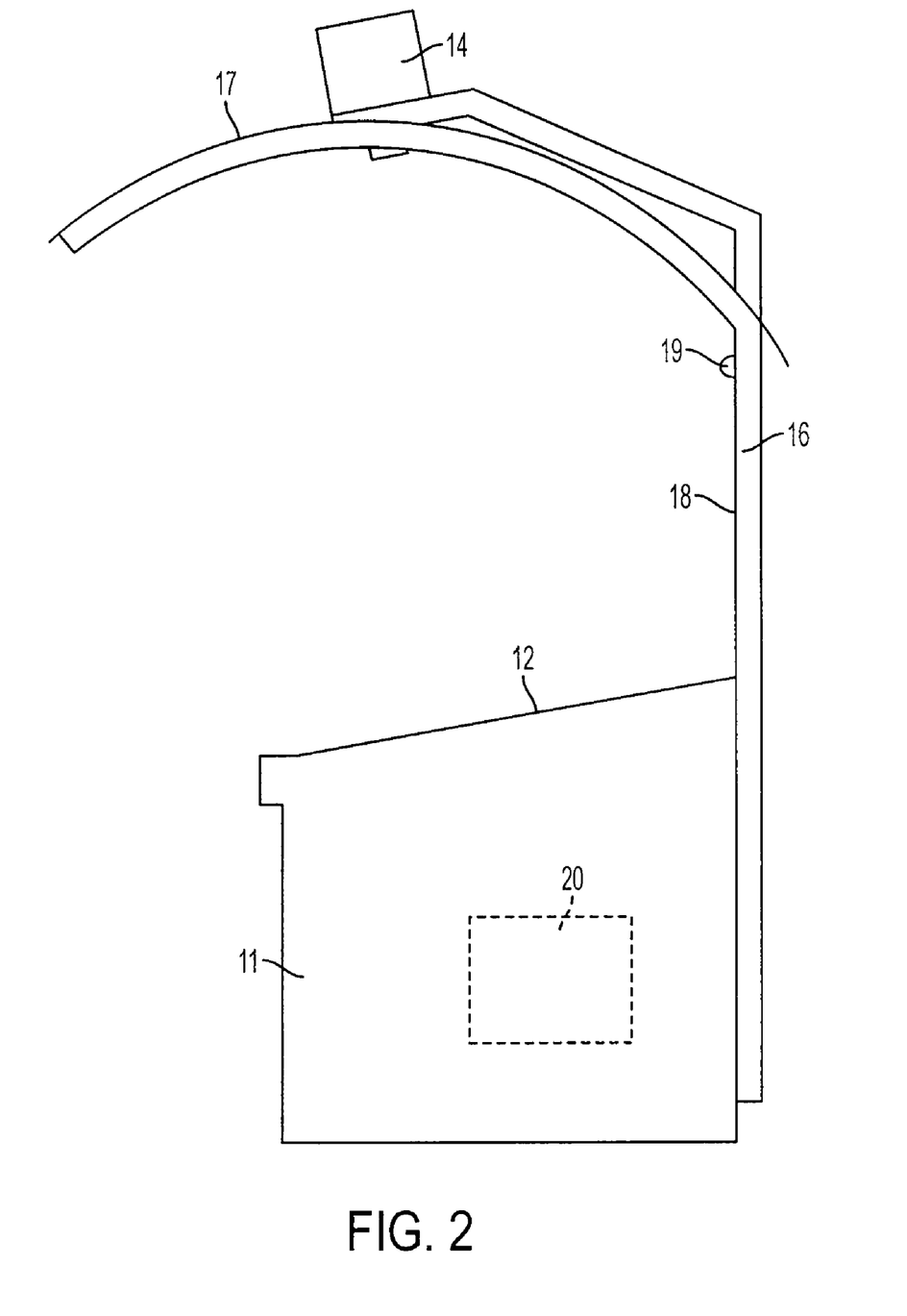
FIG. 2 is a side view of the print tone measuring apparatus.

An embodiment of this invention will be described hereinafter with reference to the drawings. FIG. 1 is a perspective view of a print tone measuring apparatus in a first embodiment of the invention. FIG. 2 is a side view of the apparatus. It is to be noted that light sources 13 and a control panel 15 are omitted from FIG. 2.

This print tone measuring apparatus is used to create control data for controlling ink feeding rates of a printing machine by measuring image tones of reference paper and actual prints. The print tone measuring apparatus includes a table 12 disposed above a frame 11, a pair of light sources 13 arranged at right and left sides of the table 12, an image pickup unit 14 disposed above the table 12, a control panel 15 disposed above one of the light sources 13, an upper light-shielding plate 17 and a rear light-shielding plate 18 supported by a pair of posts 16, an auxiliary light source 19 attached to the rear light-shielding plate 18, and a control unit 20 mounted inside the frame 11 for controlling the entire apparatus.

The table 12 is shaped planar for receiving a print thereon. The table 12 has a surface in the form of a suction plate for holding the print by static electricity or vacuum suction. The surface of the table 12 is inclined about 10 degrees for facility of operation by the operator. The print held by suction on the inclined surface of the table 12 is illuminated by the pair of light sources 13 arranged at the opposite sides.

The image pickup unit 14 disposed above the table 12 has a digital camera for separating, with a dichroic mirror, light emitted from the light sources 13 and reflected from the surface of the print into the three primary color components of RGB, and receiving the individual components with separate CCD arrays. With this image pickup unit 14, RGB data can be obtained from the print.

The control panel 15 is the touch panel type in the form of an LCD monitor having a pressure sensitive input function (also called a touch sensitive screen). This control panel 15 acts as both a display device and an input device, and is connected to the control unit 20 described hereinafter.

Figure 3:
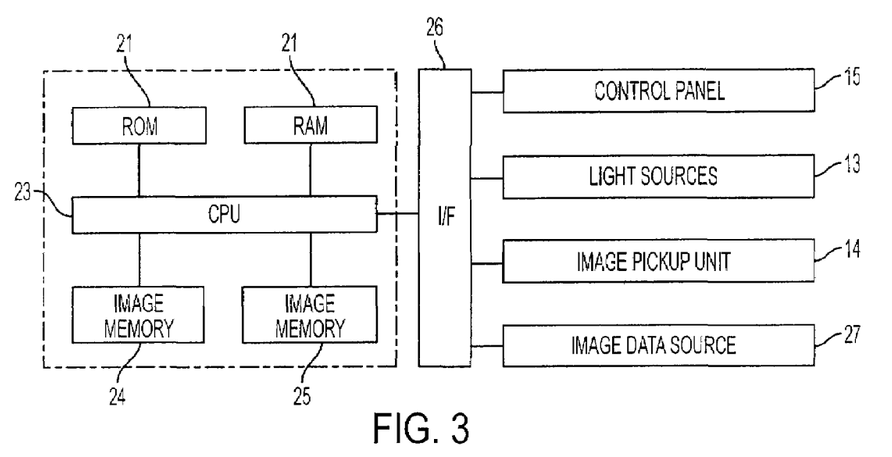
FIG. 3 is a block diagram showing a principal structure of a control unit.

FIG. 3 is a block diagram showing a principal structure of the control unit 20.

This control unit 20 includes a ROM 21 for storing operating programs necessary for controlling the apparatus, a RAM 22 for temporarily storing data and the like during a control operation, a CPU 23 for performing logic operations, and a first and a second image memories 24 and 25. The control unit 20 is connected through an interface 26 to the control panel 15, light sources 13 and image pickup unit 14 noted above. The control unit 20 is connected also to an image data source 27 storing image data to be printed, such as a hard disk or an image processing device.

Referring again to FIGS. 1 and 2, the upper light-shielding plate 17 supported by the pair of posts 16 has a curved configuration extending in the fore and aft direction of the print tone measuring apparatus. The light-shielding plate 17 is installed in order to intercept light, such as light from indoor light sources, that would constitute a regular reflection from the table 12. On the other hand, the rear light-shielding plate 18 supported between the pair of posts 16 serves to intercept light coming from behind the print tone measuring apparatus.

The auxiliary light source 19 attached to the rear light-shielding plate 18 serves to compensate for a lack of light on the table 12 caused by the upper light-shielding plate 17 and rear light-shielding plate 18. The auxiliary light source 19 is in the form of a fluorescent light or the like, which is turned off when reading an image of a print with the image pickup unit 14.

Figure 4:
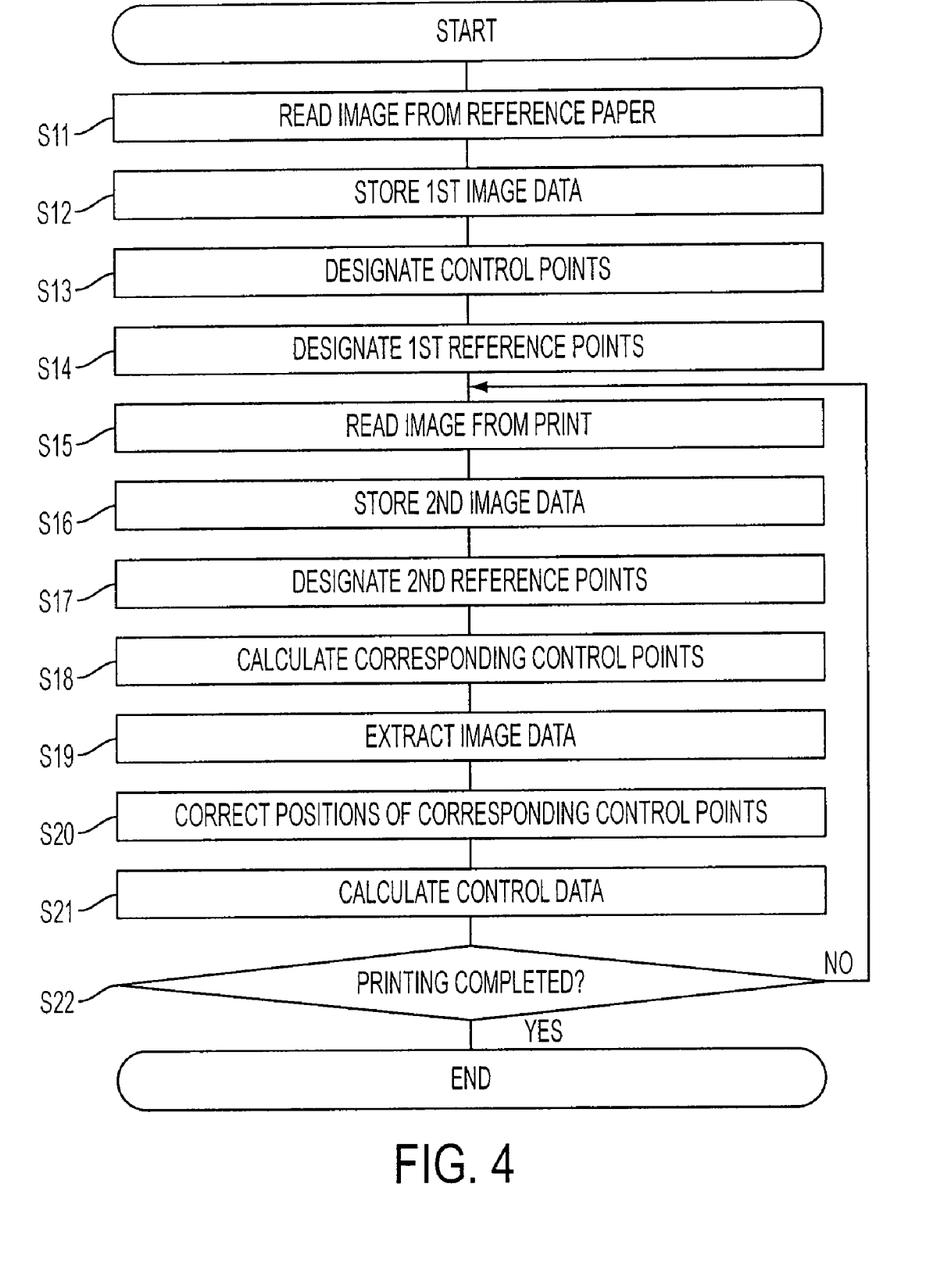
FIG. 4 is a flow chart of a print tone measuring operation.

A print tone measuring operation using the apparatus having the above construction will be described next. This operation is carried out to obtain data for controlling ink feeding rates of a printing machine. FIG. 4 is a flow chart of the print tone measuring operation.

To obtain data for controlling the ink feeding rates of the printing machine, the image of the reference paper is first read by using the print tone measuring apparatus (step S11). Specifically, the reference paper is placed on the table 12 and held thereon by suction. The reference paper is illuminated by the light sources 13, and the image of the reference paper is read by the image pickup unit 14. Data of the image of the reference paper is stored as first image data in the first image memory 24 of the control unit 20 (step S12).

Figure 5:
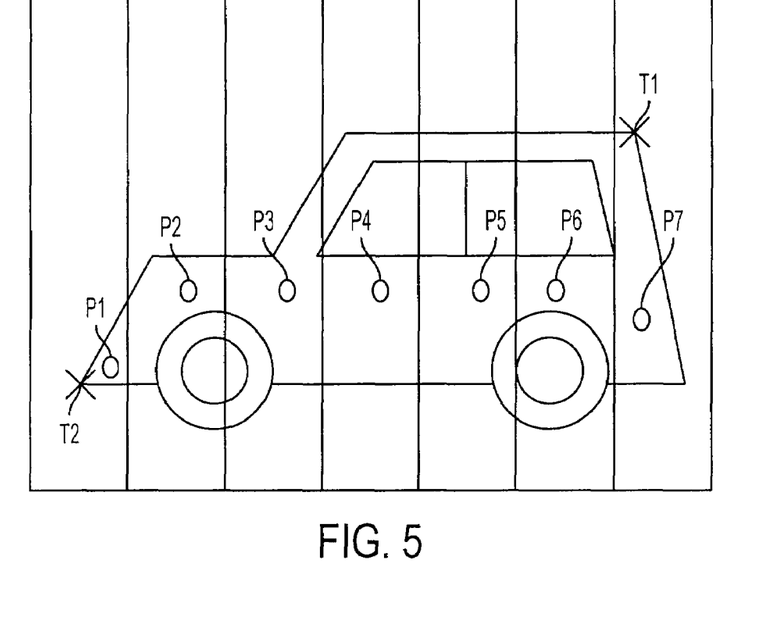
FIG. 5 is an explanatory view showing an image of reference paper displayed on a control panel.

The image data of the reference paper stored in the first image memory 24 is displayed on the control panel 15. FIG. 5 is an explanatory view showing the image of the reference paper displayed on the control panel 15. In this embodiment, ink keys of the printing machine are divided into seven regions. Thus, seven regions corresponding to the ink keys are set to the image of the reference paper.

Next, control points are designated, which are key points for controlling the ink feeding rates (step S13). That is, based on the image of the reference paper displayed on the control panel 15, the operator designates control points P1-P7 (which may be collectively called "designated control points P") in the respective regions corresponding to the ink keys as shown in FIG. 5. These control points consist of representative points having colors that characterize a picture pattern on a print. The control points may be set automatically. In this specification, the control points set by the operator as described above are called designated control points. Information on the designated control points P1-P7 is stored in the first image memory 24 or RAM 22 of the control unit 20.

Next, a pair of first reference points T1 and T2 are designated for specifying image positions in the first image data (step S14). As shown in FIG. 5, the first reference points T1 and T2, preferably, are set to points on a diagonal line in the image. Information on these first reference points T1 and T2 is stored in the first image memory 24 or RAM 22 of the control unit 20. Step S13 and step S14 described above may be executed in reverse order.

Next, an image of an actual print is read (step S15). Specifically, a print extracted by the operator from a discharge station of the printing machine during a printing operation is placed on the table 12, and held thereon by suction. This print is illuminated by the light sources 13, and the image of the print is read by the image pickup unit 14. Data of the image of the print is stored as second image data in the second image memory 25 of the control unit 20 (step S16).

The image data of the print stored in the second image memory 24 is displayed on the control panel 15 as is the image data of the reference paper. Then, a pair of second reference points T3 and T4 are designated to correspond to the pair of first reference points T1 and T2 designated in the first image data (step S17). Information on these second reference points T3 and T4 is stored in the second image memory 25 or RAM 22 of the control unit 20.

Then, control points on the image of the actual print corresponding to the positions of the above designated control points P1-P7 are calculated (step S18). Specifically, positions of the corresponding control points are determined by geometrical calculation from position data of the first reference points T1 and T2, second reference points T3 and T4 and designated control points P1-P7 determined previously. Seven such corresponding control points are set to the respective regions corresponding to the ink keys of the printing machine, as are the designated control points P1-P7 shown in FIG. 5. Information on these corresponding control points is stored in the second image memory 25 or RAM 22 of the control unit 20.

This corresponding control point calculating step should provide the respective designated control points and corresponding control points having coordinates positions in agreement. However, a partial distortion of the image of the print could inhibit an accurate agreement between the coordinates of the designated control points on the reference paper and the coordinates of the corresponding control points on the print. In the print tone measuring method according to this invention, therefore, the following steps are executed to achieve an accurate agreement between the coordinates of the designated control points on the reference paper and the coordinates of the corresponding control points on the print.

To achieve an agreement between the coordinates of the designated control points and the coordinates of the corresponding control points, image data adjacent each designated control point and image data adjacent the corresponding control point are extracted (step S19).

Figure 6A:
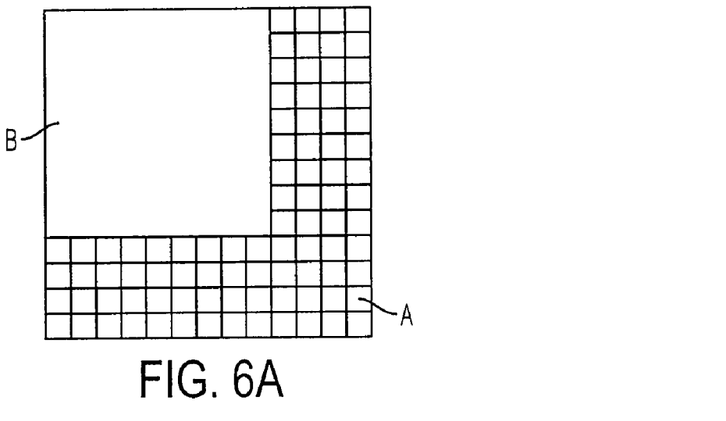
FIG. 6A is an explanatory view showing image data A adjacent a designated control point and image data B adjacent a corresponding control point.
Figure 6B:
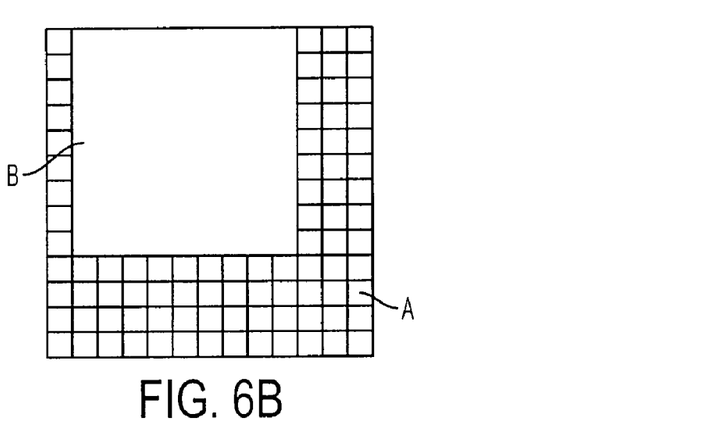
FIG. 6B is an explanatory view showing image data A adjacent the designated control point and image data B adjacent the corresponding control point.
Figure 6C:
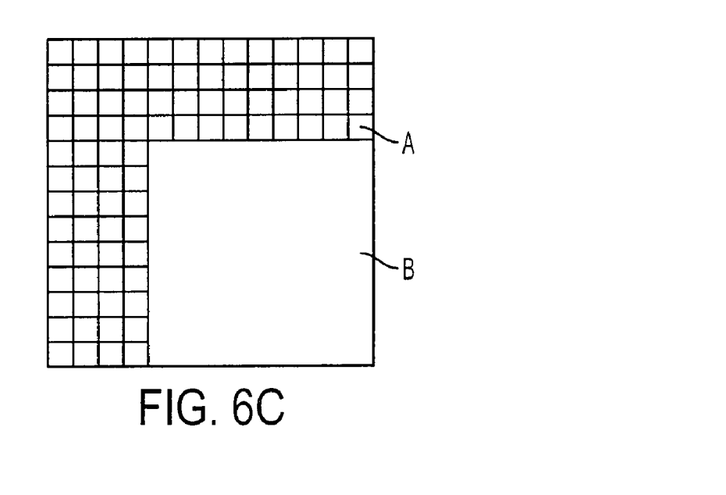
FIG. 6C is an explanatory view showing image data A adjacent the designated control point and image data B adjacent the corresponding control point.

FIGS. 6A through 6C are explanatory views showing image data A adjacent a designated control point and image data B adjacent a corresponding control point.

As shown in these figures, image data A adjacent the designated control point includes 169 pixels of each of R, G and B in an arrangement of 13 rows by 13 columns. On the other hand, image data B adjacent the corresponding control point includes 81 pixels of each of R, G and B in an arrangement of 9 rows by 9 columns. The position of the corresponding control point is corrected by comparing these image data A and B (step S20). In this embodiment, image data A is larger in size than image data B in order to simplify an operating algorithm by causing the two image data to overlap each other constantly when determining differences between the pixels while shifting the image data pixel by pixel. Thus, there is no limitation in the sizes of pixel data A and B. The step of correcting the position of the corresponding control point is performed as follows.

As shown in FIG. 6A, the image data B adjacent the corresponding control point is arranged relative to the image data A adjacent the designated control point with the respective upper and left ends placed in register. In this state, differences (sums of R, G and B) between all the pixels in the image data B and corresponding pixels in the image data A are added up and the resulting value is stored. This cumulative addition is carried out, with the differences not taking negative values but taking absolute values.

Next, as shown in FIG. 6B, the image data B is shifted by one pixel to the right. Then, differences between all the pixels in the image data B and corresponding pixels in the image data A are added up and the resulting value is stored. This operation is repeated 25 times by moving the image data B rightward or downward by one pixel at a time. Consequently, as shown in FIG. 6C, the image data A and image data B assume an arrangement with the respective lower and right ends in register.

Then, a minimum value is determined among the 25 cumulative sums acquired by the above matching operation. The position of image data B adjacent the corresponding control point providing the minimum value is a position of an accurate corresponding control point. Thus, a necessary correction is made to the information on the corresponding control point previously stored in the second image memory 25 or RAM 22 of the control unit 20. The coordinates of the designated control point and the coordinates of the corresponding control point are thereby brought into accurate agreement even when a partial distortion occurs with the image of the print.

In the above matching operation, the image data A adjacent each designated control point is extracted in 13 rows by 13 columns, and the image data B adjacent the corresponding control point is extracted in 9 rows by 9 columns. The position of the corresponding control point may be corrected even if the coordinates of the designated control point and the coordinates of the corresponding control point are displaced relative to each other by two pixels. Where the image data A adjacent each designated control point is extracted in 15 rows by 15 columns, for example, the position of the corresponding control point may be corrected even if the coordinates of the designated control point and the coordinates of the corresponding control point are displaced relative to each other by three pixels.

After achieving an accurate agreement between the coordinates of the designated control points and the coordinates of the corresponding control points as described above, control data for controlling the ink feeding rates of the printing machine is calculated for the respective regions corresponding to the ink keys of the printing machine by using color data of the designated control points and color data of the corresponding control points (step S21). This control data is transmitted on-line or off-line through the interface 26 shown in FIG. 3 to the printing machine not shown. The above matching operation is described by way of example only, and a different pattern matching technique (calculation) may be used.

Then, whether a required number of prints have been made is determined (step S22). When the required number of prints has not been made, the operation in step S15 to step S21 is repeated. At this time, the operator extracts a print, for image reading, from the discharge station of the printing machine upon completion of every 100 prints, for example. When the required number of prints has been made, the operation is terminated.

In the embodiment described above, image data obtained by reading the image of the reference paper is used as the image data for reference. Instead, the image data supplied from the image data source 27 for platemaking purposes may be used as the reference image data. The described order of image reading from the reference paper and print may be reversed.

In the embodiment described above, the designated control points are set to the image of the reference paper, to correct the coordinates of the corresponding control points on the image of the actual print. Instead, designated control points may be set to the image of the actual print, to correct the coordinates of the corresponding control points on the image of the reference paper.

Figure 7:
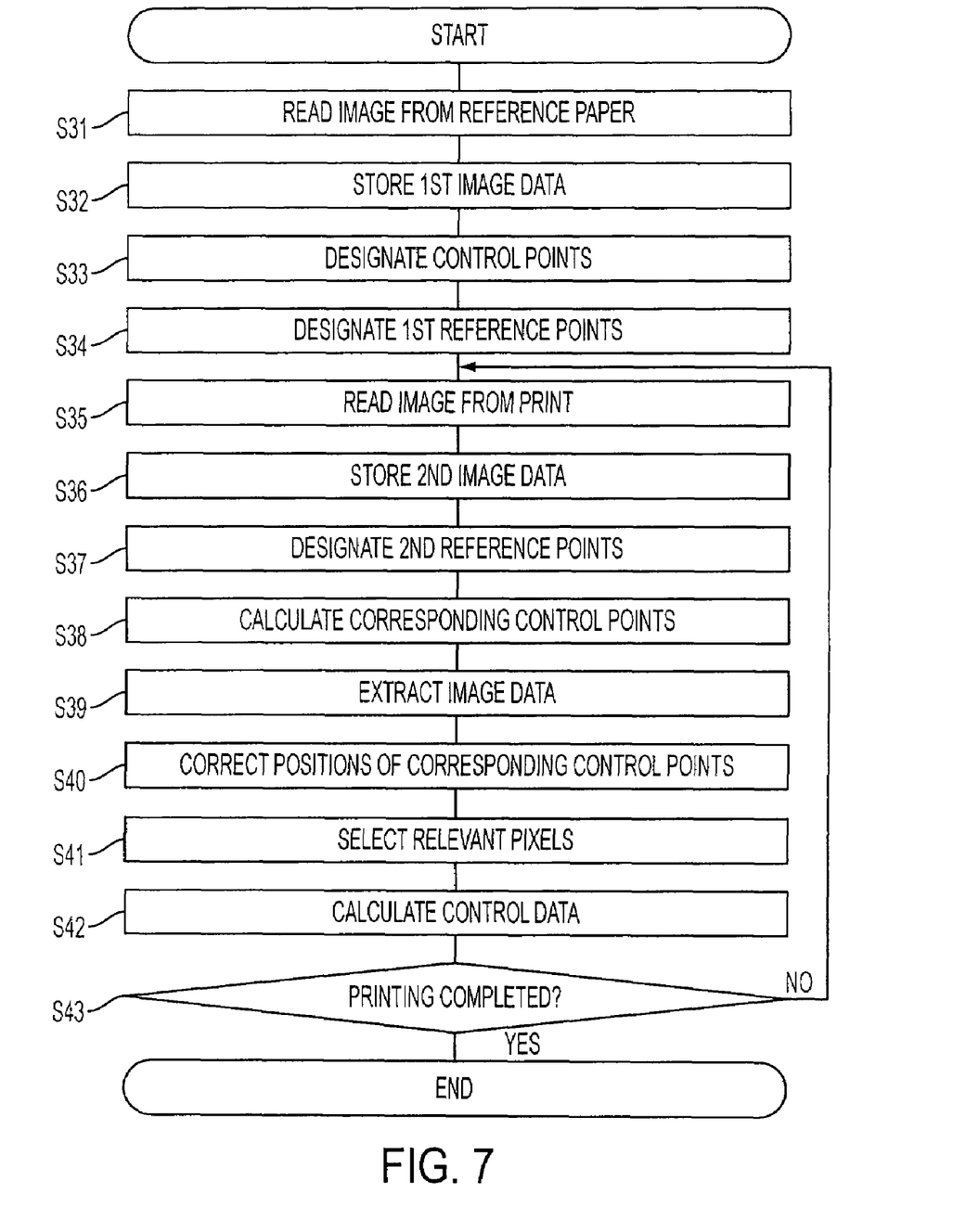
FIG. 7 is a flow chart of a print tone measuring operation in a second embodiment.

A print tone measuring method in a different embodiment of the invention will be described next. FIG. 7 is a flow chart showing a print tone measuring method in a second embodiment.

In the foregoing embodiment, after achieving an accurate agreement between the coordinates of the designated control points and the coordinates of the corresponding control points, control data for controlling the ink feeding rates of the printing machine is calculated for the respective regions corresponding to the ink keys of the printing machine by using color data of the designated control points and color data of the corresponding control points.

However, an image area usually is formed of halftone dots, and particularly where large halftone dots are used, a disagreement may occur between color information on a single pixel and color information on an image formed of a plurality of halftone dots. Noise of a CCD camera acting as an image pickup device, or dust or scratches on the print, may also hamper an accurate measurement based on color information on a single pixel.

In the second embodiment, after correcting the positions of the corresponding control points as in the first embodiment described above, image data of a region including a designated control point among the image data adjacent the designated control point in the first image data is compared with a plurality of templates having different pixel arrangements. Pixels present in the same positions as the pixels arranged in a template are selected as relevant pixels in the first image data. Thereafter, data for controlling the ink feeding rates of the printing machine is calculated for the respective regions corresponding to the ink keys of the printing machine by comparing an average of colors of the relevant pixels in the first image data and an average of colors of relevant pixels in the second image data.

In the second embodiment, a relevant pixel selecting step (step S41) is executed after steps S31 to S40 which are the same as steps S11 to S20 in the first embodiment. This relevant pixel selecting step is executed as follows.

Figure 8:
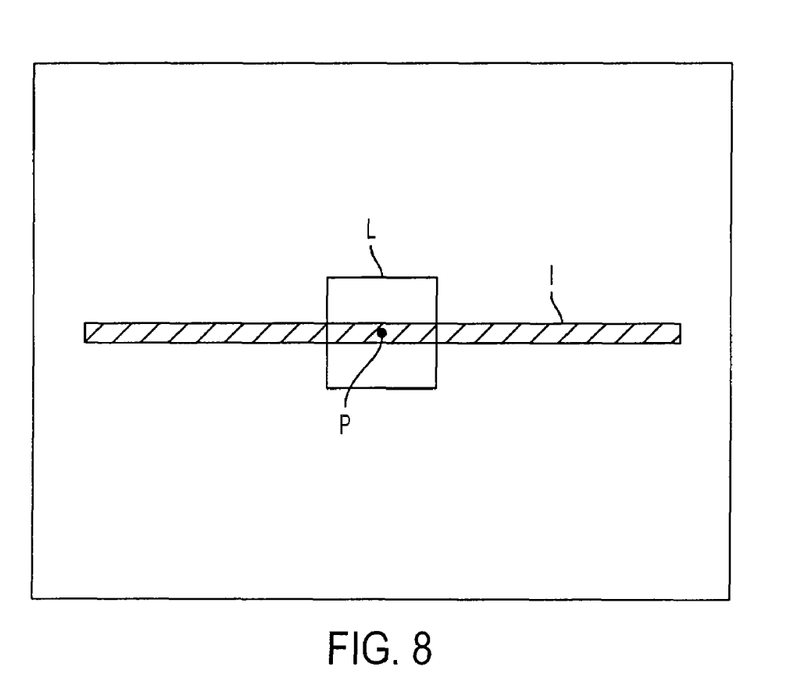
FIG. 8 is an explanatory view showing an image adjacent a designated control point P displayed on the control panel.

First, image data adjacent each designated control point P is displayed on the control panel 15. FIG. 8 is an explanatory view showing an image adjacent the designated control point P displayed on the control panel 15. In FIG. 8, a linear pattern I is shown to extend in the transverse direction.

Next, relevant pixels relating to each designated control point P are selected. Specifically, image data including the designated control point P among the image data adjacent the designated control point P extracted previously is compared with a plurality of templates having different pixel arrangements, and a template closest to the image of a region including the designated control point P is selected. Pixels present in the same positions as the pixels arranged in the selected template are selected as relevant pixels.

FIGS. 9A through 9H are schematic views showing eight templates having different pixel arrangements. These templates have regions arranged in five rows by five columns. In these figures, the regions having pixels are hatched.

When selecting relevant pixels, as shown in FIG. 8, the center of a template L among the eight templates shown in FIGS. 9A-9H is placed to coincide with the designated control point P. Then, an extent to which the positions of the pixels in this template L correspond to the pattern I is determined by calculating distributions of the pixels. When, for example, templates L having five pixels as shown in FIGS. 9E-9H are used, distribution Mr of the R color is derived from the following equation:

$$Mr = [(A-F)^2 + (B-F)^2 + (C-F)^2 + (D-F)^2 + (E-F)^2]/5$$

where A, B, C, D and E are pixel values of the five pixels, and F is an average of the pixel values A, B, C, D and E.

The same equation is used for deriving distributions Mg and Mb of the G color and B color. When the templates L having seven pixels as shown in FIGS. 9A-9D are used, distributions Mr, Mg and Mb of RGB colors may be derived from a similar equation including seven terms corresponding to the seven pixels.

Next, a final distribution M is derived from the following equation:

$$M = (Mr + Mg + Mb)/3$$

Figure 9A:
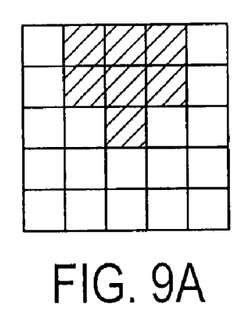
FIG. 9A is a schematic view of a template.
Figure 9B:
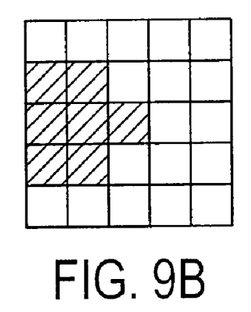
FIG. 9B is a schematic view of a template.
Figure 9C:
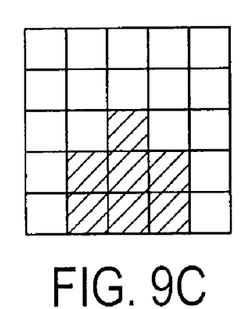
FIG. 9C is a schematic view of a template.
Figure 9D:
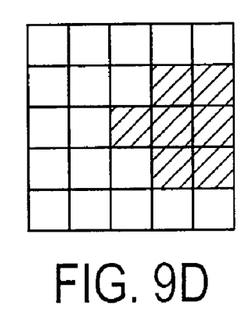
FIG. 9D is a schematic view of a template.
Figure 9E:
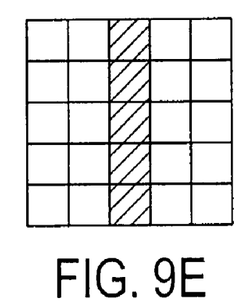
FIG. 9E is a schematic view of a template.
Figure 9F:
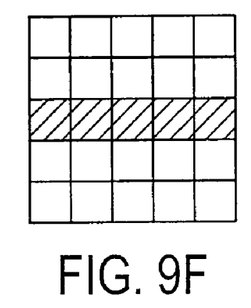
FIG. 9F is a schematic view of a template.
Figure 9G:
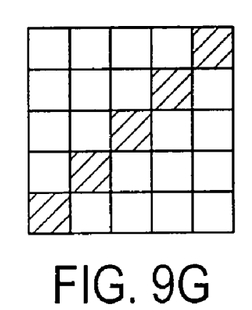
FIG. 9G is a schematic view of a template.
Figure 9H:
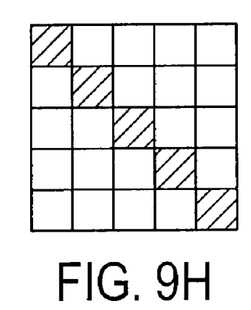
FIG. 9H is a schematic view of a template.

While changing the eight templates L shown in FIGS. 9A-9H one after another, distributions M are obtained for all the eight templates L shown in FIGS. 9A-9H. The template L providing a minimum distribution M among these distributions M is determined and selected as the closest to the pattern adjacent the designated control point P extracted previously. In the case of the pattern I shown in FIG. 8, the template L shown in FIG. 9F is selected. The pixels arranged in the selected template L are selected as relevant pixels relating to the designated control point P.

Next, image data adjacent each control point is displayed on the control panel 15. Then, relevant pixels relating to the corresponding control points are selected from the image data adjacent the corresponding control points. Specifically, the center of selected template L shown in FIG. 9F may be placed to coincide with a corresponding control point. In this state, pixels arranged in the same positions as the pixels in the selected template L shown in FIG. 9F are selected as relevant pixels.

When the relevant pixel selecting step (step S41) is completed by the above operation, control data for controlling the ink feeding rates of the printing machine is calculated for the respective regions corresponding to the ink keys of the printing machine by using color data of the designated control points and color data of the corresponding control points (step S42). At this time, an average of the colors of the relevant pixels relating to the designated control points P is determined as color of the designated control points. An average of the relevant pixels relating to the corresponding control points is determined as color of the corresponding control points. That is, the average of the colors of the relevant pixels relating to the designated control points P is used as data of the color of the designated control points, and the average of the relevant pixels relating to the corresponding control points is used as data of the corresponding control points. Thus, color may be measured accurately even where large halftone dots are used, noise occurs with a CCD camera, or dust or scratches is/are present on the print.

Weighted averages may be used instead of an average of the colors of the relevant pixels relating to the designated control points P and an average of the relevant pixels relating to the corresponding control points. In this case, values of the control points may be regarded as high and values of surrounding areas regarded as low, or values may be weighted according to distances from the control points.

The control data is transmitted on-line or off-line through the interface 26 shown in FIG. 3 to the printing machine not shown.

Then, whether a required number of prints have been made is determined (step S43). When the required number of prints has not been made, the operation in step S35 to step S42 is repeated. At this time, the operator extracts a print, for image reading, from the discharge station of the printing machine upon completion of every 100 prints, for example. When the required number of prints has been made, the operation is terminated.

In this embodiment, image data of a region including a designated control point among the image data adjacent the designated control point is compared with a plurality of templates having different pixel arrangements. A template closest to the image of the region including the designated control point is selected. Pixels present in the same positions as the pixels arranged in the selected template are selected as relevant pixels. However, of the image data adjacent each designated control point, pixels within a predetermined range of color differences with respect to the color of the designated control point may be selected as relevant pixels. In this case, step S41 shown in FIG. 7 may be executed to select pixels in the positions corresponding to the relevant pixels selected in step S4, as relevant pixels relating to the corresponding control point.

In the embodiment described above, image data obtained by reading the image of the reference paper is used as the image data for reference. Instead, the image data supplied from the image data source 27 for platemaking purposes may be used as the reference image data. The described order of image reading from the reference paper and print may be reversed.

In the embodiment described above, the designated control points are set to the image of the reference paper, to correct the coordinates of the corresponding control points in the image of the actual print. Instead, designated control points may be set to the image of the actual print, to correct the coordinates of the corresponding control points on the image of the reference paper.

This invention may be embodied in other specific forms without departing from the spirit or essential attributes thereof and, accordingly, reference should be made to the appended claims, rather than to the foregoing specification, as indicating the scope of the invention.

This application claims priority benefit under 35 U.S.C. Section 119 of Japanese Patent Applications No. 2003-166335 and No. 2003-166336 filed in the Japanese Patent Office on Jun. 11, 2003, the entire disclosure of which is incorporated herein by reference.

What is claimed is:

1. A print tone measuring method for obtaining data for controlling ink feeding rates of a printing machine by comparing data of control points in image data obtained by reading an image of reference paper and data of control points in image data obtained by reading an image of an actual print, said method comprising:

a reference paper reading step for reading the image of the reference paper to obtain first image data;

a designated control point setting step for setting designated control points to said first image data for use in measuring the print, said designated control points being set to respective regions on the reference paper corresponding to ink keys of the printing machine;

a first reference point setting step for setting a pair of first reference points to said first image data for specifying image positions;

a print reading step for reading the image of the actual print to obtain second image data;

a second reference point setting step for setting a pair of second reference points to said second image data to correspond to said first reference points;

a first calculating step for calculating, from said first reference points and said second reference points, positions of corresponding control points in said second image data corresponding to said designated control points in said first image data, for the respective regions corresponding to the ink keys of the printing machine;

an extracting step for extracting image data adjacent each of said designated control points and image data adjacent each of said corresponding control points;

a correcting step for correcting the position of each of said corresponding control points in said second image data by comparing the image data adjacent each of said designated control points and the image data adjacent each of said corresponding control points;

a first selecting step for comparing image data including each of said designated control points, of each of the regions corresponding to the ink keys of the printing machine, among the image data adjacent the designated control points in said first image data, with a plurality of templates having different pixel arrangements, selecting a template closest to the image of the region including each of said designated control points, and selecting pixels corresponding in position to pixels arranged in the selected template, as relevant pixels in said first image data;

a second selecting step for selecting, from the corresponding control points corrected, positions of relevant pixels in said second image data corresponding to the relevant points in said first image data, for the respective regions corresponding to the ink keys of the printing machine; and a second calculating step for calculating data for controlling the ink feeding rates of the printing machine by comparing color values of the relevant pixels in said first image data and color values of the relevant pixels in said second image data for the respective regions corresponding to the ink keys of the printing machine.

2. A print tone measuring method as defined in claim 1, wherein said second calculating step is executed to determine an average of the color values of the relevant pixels selected in said second selecting step as a color of the control points.

3. A print tone measuring method as defined in claim 2, wherein said first selecting step is executed to calculate a distribution of pixels in the image of the region including each of said designated control points, corresponding to the pixels arranged in said templates, and to select a template closest to the image of the region including each of said designated control points.

4. A print tone measuring method as defined in claim 2, wherein said first selecting step is executed to select, as relevant pixels, those pixels in the image data adjacent each of said control points, which are within a predetermined range of color differences with respect to a color of the control point.

5. A print tone measuring method for obtaining data for controlling ink feeding rates of a printing machine by comparing first image data serving as a reference and second image data obtained by reading an image of a print actually made by the printing machine, said method comprising:

a control point setting step for setting positions of control points to said first image data;

an extracting step for extracting image data adjacent said control points from said first image data;

a selecting step for comparing image data including said control points among the image data adjacent the control points in said first image data, with a plurality of templates having different pixel arrangements, selecting a template closest to the image of the region including said control points, and selecting pixels corresponding in position to pixels arranged in the selected template, as relevant pixels in said first image data;

a print reading step for reading the image of the actual print to obtain second image data; and a calculating step for calculating data for controlling the ink feeding rates of the printing machine by comparing color values of the relevant pixels in said first image data and color values of relevant pixels in said second image data corresponding to the relevant pixels in said first image data; wherein said calculating step is executed to determine an average of the color values of the relevant pixels selected in said second selecting step as a color of the control points; and said selecting step is executed to calculate a distribution of pixels in the image of the region including each of said designated control points, corresponding to the pixels arranged in said templates, and to select a template closest to the image of the region including each of said designated control points.

6. A print tone measuring method as defined in claim 5, wherein said selecting step is executed to select, as relevant pixels, those pixels in the image data adjacent each of said control points, which are within a predetermined range of color differences with respect to a color of the control point.

* * * * *